(12) United States Patent
Wang et al.

(10) Patent No.: US 11,341,772 B2
(45) Date of Patent: May 24, 2022

(54) DEVICE VERIFICATION SYSTEM AND DEVICE VERIFICATION METHOD

(71) Applicant: Fulian Precision Electronics (Tianjin) Co., LTD., Tianjin (CN)

(72) Inventors: Cheng-Yu Wang, New Taipei (TW); Shih Chun Wang, New Taipei (TW); Yu-Wen Chen, New Taipei (TW)

(73) Assignee: Fulian Precision Electronics (Tianjin) Co., LTD., Tianjin (CN)

( * ) Notice: Subject to any disclaimer, the term of this patent is extended or adjusted under 35 U.S.C. 154(b) by 316 days.

(21) Appl. No.: 16/653,181

(22) Filed: Oct. 15, 2019

(65) Prior Publication Data

US 2021/0027047 A1 Jan. 28, 2021

(30) Foreign Application Priority Data

Jul. 24, 2019 (CN) .......................... 201910673071.0

(51) Int. Cl.
*H04L 29/06* (2006.01)
*G06V 40/16* (2022.01)
*G08B 7/06* (2006.01)

(52) U.S. Cl.
CPC ............. *G06V 40/172* (2022.01); *G08B 7/06* (2013.01); *H04L 63/083* (2013.01); *H04L 63/0861* (2013.01); *H04L 2463/082* (2013.01)

(58) Field of Classification Search
CPC .... G06K 9/00288; G08B 7/06; H04L 63/083; H04L 63/0861; H04L 2463/082
See application file for complete search history.

(56) References Cited

U.S. PATENT DOCUMENTS

| | | | | |
|---|---|---|---|---|
| 6,963,659 B2* | 11/2005 | Tumey | ............... | G06K 9/00087 340/5.2 |
| 7,616,784 B2* | 11/2009 | Kocher | ............. | G06K 9/00906 382/115 |
| 9,959,539 B2* | 5/2018 | Han | ................. | G06Q 20/40145 |
| 10,169,646 B2* | 1/2019 | Ganong | ................. | G06T 11/60 |
| 10,346,675 B1* | 7/2019 | Nagalla | ................. | G07F 19/203 |
| 10,893,043 B1* | 1/2021 | John | ................... | G06F 21/6245 |

FOREIGN PATENT DOCUMENTS

| CN | 109636116 | 4/2019 |
|---|---|---|
| CN | 105450658 | 6/2019 |

* cited by examiner

*Primary Examiner* — Hosuk Song
(74) *Attorney, Agent, or Firm* — ScienBiziP, P.C.

(57) ABSTRACT

A device verification system includes an operation panel, a computer coupled to the operation panel, and a server coupled to the computer. The operation panel includes an image acquisition unit. The computer receives an image of an operator acquired by the image acquisition unit and acquires a facial image of the operator from the image. The server receives the facial image from the computer. The server stores a facial image of an authorized operator and is configured to compare the received facial image to the stored facial image to determine whether the operator is verified.

10 Claims, 2 Drawing Sheets

DEVICE VERIFICATION SYSTEM AND DEVICE VERIFICATION METHOD

FIELD

The subject matter herein generally relates to a device verification system and method for verifying an operator of a device.

BACKGROUND

Generally, large and hazardous workshop equipment requires an account number and password to allow an operator to operate it. However, it is easy to use other people's accounts and passwords to operate on behalf of the authorized operator. Thus, it is difficult to determine who the operator is, and unqualified people who operate the equipment are prone to cause safety incidents.

BRIEF DESCRIPTION OF THE DRAWINGS

Implementations of the present disclosure will now be described, by way of embodiments, with reference to the attached figures.

DETAILED DESCRIPTION

Figure 1:
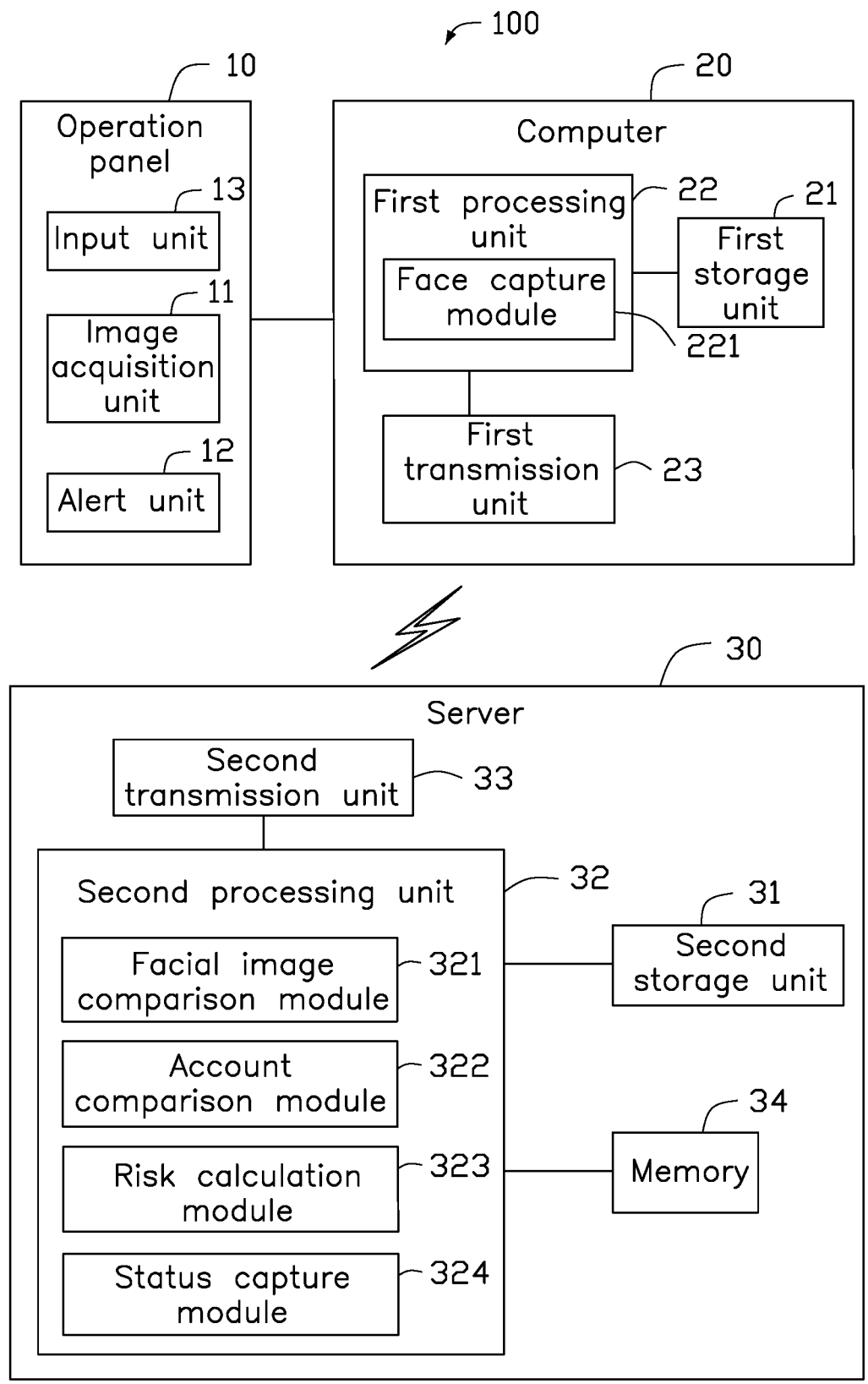
FIG. 1 is a schematic block diagram of an embodiment of a device verification system.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising" means "including, but not necessarily limited to"; it specifically indicates open-ended inclusion or membership in a so-described combination, group, series and the like.

In general, the word "module" as used hereinafter refers to logic embodied in hardware or firmware, or to a collection of software instructions, written in a programming language such as, for example, Java, C, or assembly. One or more software instructions in the modules may be embedded in firmware such as in an erasable-programmable read-only memory (EPROM). It will be appreciated that the modules may comprise connected logic units, such as gates and flip-flops, and may comprise programmable units, such as programmable gate arrays or processors. The modules described herein may be implemented as either software and/or hardware modules and may be stored in any type of computer-readable medium or other computer storage device.

FIG. 1 shows an embodiment of a device verification system 100 including an operation panel 10, a computer 20, and a server 30. The operation panel 10 and the computer 20 are both disposed on a device (not shown) to be operated. The operation panel 10 is communicatively coupled to the computer 20, and the computer 20 is communicatively coupled to the server 30. The computer 20 and the server 30 may be wired or wirelessly connected.

The operation panel 10 includes an image acquisition unit 11 for acquiring an image of an operator who is operating the device. The image acquisition unit 11 may be a camera or the like.

The computer 20 includes a first storage unit 21, a first processing unit 22, and a first transmission unit 23. The first processing unit 22 is connected to the first storage unit 21 and the first transmission unit 23. The first storage unit 21 is configured to store a plurality of instructions executed by the first processing unit 22. The first processing unit 22 includes at least a face capture module 221.

The first processing unit 22 is configured to control the image acquisition unit 11 to acquire an image of the operator and transmit the image to the computer 20.

The first processing unit 22 is further configured to control the face capture module 221 to capture an image of an operator's face in the image.

The first processing unit 22 is further configured to control the first transmission unit 23 to transmit the facial image to the server 30.

The first storage unit 21 may be an internal storage system, such as a flash memory, a random access memory (RAM), or a read only memory ROM. The first storage unit 21 may also be a storage system such as a video disc, a memory card, or a data storage medium. The first processing unit 22 may be a central processing unit, a digital signal processor, a single chip microcomputer, or the like.

Other functional structures of the computer 20 are simplified for description, and are not described herein again.

The server 30 includes a second storage unit 31, a second processing unit 32, a second transmission unit 33, and a memory 34. The second processing unit 32 is connected to the second storage unit 31 and the memory 34. The second transmission unit 33 is communicatively coupled to the first transmission unit 23. An image of an authorized operator's face is stored in the memory 34. The second storage unit 31 is configured to store a plurality of instructions executed by the second processing unit 32. The second processing unit 32 includes at least a facial image comparison module 321.

The second processing unit 32 is configured to control the second transmission unit 33 to receive the facial image transmitted by the first transmission unit 23.

The facial image comparison module 321 is configured to acquire the facial image received by the second transmission unit 33 and the facial image stored in the memory 34, and compare and determine whether the operator passes verification. A comparison result of the facial image matching module 321 is stored in the memory 34. Specifically, the comparison result of the facial image comparison module 321 shows that the operator passes verification or fails verification.

The second storage unit 31 and the memory 34 may be an internal storage system such as a flash memory, a RAM, or a ROM. The second storage unit 31 and the memory 34 may also be a storage system, such as a video disc, a memory card, or a data storage medium.

The second processing unit 32 may be a central processing unit, a digital signal processor, a single chip microcomputer, or the like.

Other functional structures of the server 30 are simplified for description, and are not described herein again.

The operation panel 10 includes a alert unit 12. The second processing unit 32 further controls the second transmission unit 33 to transmit the comparison result to the computer 20. The first processing unit 22 further controls the first transmission unit 23 to receive the comparison result and control the alert unit 12 to issue an alert when the comparison result shows that the operation result fails verification. The alert may be any one of a warning light, a warning sound, or a combination of the two.

The operation panel 10 further includes an input unit 13 for an operator to input an account number and a password. The memory 34 stores an account number and a password of an authorized operator. The second processing unit 32 further includes an account comparison module 322.

Before the image acquisition unit 11 acquires an image of the operator, the first processing unit 22 further controls the computer 20 to receive the account number and the password from the input unit 13 and controls the first transmission unit 23 to transfer the received account number and password to the server 30.

The second processing unit 32 further controls the second transmission unit 33 to receive the account number and password from the first transmission unit 23, controls the account comparison module 322 to acquire the received account number and password and the authorized account number and password, and compare the received account number and password to the authorized account number and password to determine whether the operator passes verification. If the comparison result is passed, then the image acquisition unit 11 acquires an image of the operator. If the comparison result is failed, the verification process is terminated.

The second processing unit 32 further includes a risk calculation module 323, and the memory 34 stores information of an authorized operator.

When the comparison result of the facial image comparison module 321 passes verification, the second processing unit 32 controls the risk calculation module 323 to acquire corresponding information of the operator to determine a rank of the operator and store the determined rank of the operator in the memory 34. The second transmission unit 33 transmits the determined rank to the computer 20.

The first processing unit 22 further controls the first transmission unit 23 to receive the determined rank and controls the alert unit 12 to issue the alert at a corresponding frequency according to the determined rank.

The information of the operator includes, but is not limited to, assessment information of the device, operation hours of the device, and the like.

The rank of the operator may be one of, but not limited to, novice, skilled, and veteran. A risk level of the ranks include high risk, medium risk, and mild risk.

The alert frequency may be correspond to a blinking frequency of light, a pitch frequency of sound, or a combination of the two. When the risk level is higher, the alert frequency may be faster.

The second processing unit 32 further includes a status capture module 324.

When the operator ends operation, the second processing unit 32 is configured to control the status capture module 324 to retrieve operation information of the operator's operation and store the operation information in the memory 34. In another embodiment, the status capture module 324 retrieves the device information of the operator, integrates the operation information with the device information, and stores the integrated information in the memory to replace previous device information in the memory 34.

Figure 2:
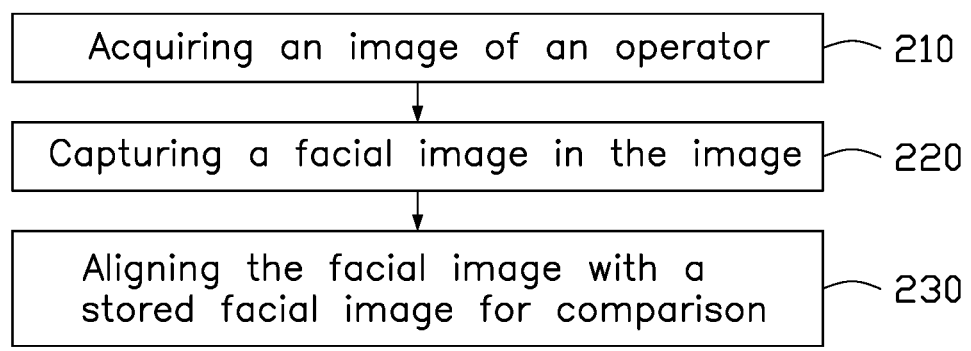
FIG. 2 is a flowchart diagram of a device verification method.

FIG. 2 shows a flowchart of an embodiment of a device verification method. The device verification method can include the following blocks.

At block 210, an image of an operator is acquired. Specifically, the image of the operator is acquired by the image acquisition unit 11 on the operation panel 10. The operation panel 10 may be located on the device to be operated. The image acquisition unit 11 may be a camera or the like.

At block 220, a facial image in the image is captured. Specifically, the image is transmitted to the computer 20, and the facial image of the operator in the image is captured by the face capture module 221 of the computer 20. The computer 20 may be located on the device to be operated and is communicatively coupled to the operation panel 10.

At block 230, the captured facial image is aligned with a facial image stored in a memory and compared. Specifically, the facial image is transmitted to the server 30, which includes the memory 34. A facial image of an authorized operator is stored in the memory 34, and the facial image captured by the facial image comparison module 321 of the server 30 is compared with the facial image stored in the memory 34. The facial image is determined to pass or fail verification, and the comparison result of the facial image matching module 321 is stored in the memory 34. Specifically, if the captured facial image matches the facial image stored in the memory 34, the comparison result passes verification. Otherwise, the comparison result fails verification.

The computer 20 is communicatively coupled to the server 30. The computer 20 and the server 30 may be wired or wirelessly connected. The memory 34 may be an internal storage system, such as a flash memory, a RAM, or a ROM. The memory 34 may also be a storage system such as a video disc, a memory card, or a data storage medium.

The operation panel 10 further includes an alert unit 12. The comparison result is transmitted to the computer 20. If the comparison result fails verification, the alert unit 12 is controlled to issue an alert. The alert may be one of a warning light, a warning sound, or a combination of two.

The operation panel 10 further includes an input unit 13. Before block 210, an account number and an account password are input through the input unit 13. The input account number and password are transmitted to the server 30 through the computer 20. Whether the operator passes verification is determined by comparing the input account number and password to the corresponding account number and password stored in the memory 34. If the comparison result passes verification, block 210 and subsequent blocks are implemented. If the comparison result fails verification, the verification process is terminated.

The memory 34 further stores the information of the authorized operator. When the comparison result passes verification, the device information corresponding to the operator is acquired.

When the comparison result passes verification, the device information corresponding to the operator is acquired. The risk calculation module 323 of the server 30 determines the rank of the operator, stores the determined rank in the memory 34, and transmits the determined rank to the computer 20.

The alert unit 12 is controlled by the computer 20 to issue the alert at the corresponding frequency according to the determined rank.

The information of the operator includes, but is not limited to, assessment information of the device, operation hours of the device, and the like.

The rank of the operator may be one of novice, skilled, and veteran. The risk corresponding to the determined rank may be high risk, medium risk, or mild risk.

The frequency of the alert may be one of a blinking frequency of a warning light, a pitch frequency of a warning tone, or a combination of the two. When the risk is higher, the frequency is faster.

In one embodiment, when the operator ends operation, the operation information of the operator's operation is retrieved and stored in the memory 34. In another embodiment, the device information of the operator is retrieved, integrated with the operation information, and stored in the memory to replace previous device information in the memory 34.

Compared with the related art, the device verification system 100 and the device verification method optimize verification of an operator operating the device by the facial recognition technology. If the operator does not pass verification for operating the device, the corresponding alert frequency can alert that the operator is not verified to operate the device, thereby effectively improving safety of hazardous devices.

In addition, the device verification system 100 and the device verification method may combine account number and password verification with the facial recognition verification, so that even if the account number and password are input correctly, the facial recognition verification can be used to assist in distinguishing whether the operation is performed by the verified operator, which can effectively prevent others who are not verified to operate the device from acting on behalf of the operator.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A device verification system comprising:
an operation panel;
a computer communicatively coupled to the operation panel; and
a server communicatively coupled to the computer; wherein:
the operation panel comprises an image acquisition unit configured to acquire an image of an operator operating the device;
the computer comprises a first storage unit, a first processing unit, and a first transmission unit;
the first processing unit is communicatively coupled to the first storage unit and the first transmission unit;
the first storage unit stores a plurality of instructions executable by the first processing unit;
the first processing unit is configured to control the image acquisition unit to transmit the acquired image to the computer;
the first processing unit is further configured to acquire a facial image of the operator from the acquired image; and
control the first transmission unit to transmit the facial image to the server;
the server comprises a second storage unit, a second processing unit, a second transmission unit, and a memory;
the second processing unit is communicatively coupled to the second storage unit, the second transmission unit, and the memory;
the second transmission unit is communicatively coupled to the first transmission unit;
the memory stores a facial image of an authorized operator;
the second storage unit stores a plurality of instructions executable by the second processing unit;
the second processing unit is configured to control the second transmission unit to receive the facial image from the first transmission unit; and
the second processing unit is configured to compare the received facial image to the facial image stored in the memory to determine whether the received facial image passes verification;
wherein the operation panel further comprises an input unit for inputting an account number and password;
the memory further stores an account number and password of the authorized operator;
before acquiring the image of the operator, the first processing unit is further configured to control the computer to receive the account number and the password from the input unit and control the first transmission unit to transmit the received account number and password to the server;
the second processing unit is further configured to control the second transmission unit to receive the account number and password from the first transmission unit, acquire the received account number and password and the authorized account number and password, and compare the received account number and password to the authorized account number and password to determine whether the operator passes verification; and
if the comparison result passes verification, then the image acquisition unit acquires the image of the operator.

2. The device verification system of claim 1, wherein:
the operation panel further comprises an alert unit;
the second processing unit is further configured to store a comparison result of the facial image to the memory; and
the second processing unit is further configured to control the second transmission unit to transmit the comparison result to the computer;
the first processing unit is further configured to control the first transmission unit to receive the comparison result and control the alert unit to issue an alert when the comparison result fails verification.

3. The device verification system of claim 1, wherein:
the operation panel further comprises an alert unit;
the memory further stores device information of the authorized operator;
when the comparison result of the facial image passes verification, the second processing unit is further configured to acquire the device information of the operator, determine a rank of the operator, store the determined rank in the memory, and control the second transmission unit to transmit the determined rank to the computer; and the first processing unit is further configured to control the first transmission unit to receive the determined rank, control the alert unit to issue an alert at a corresponding frequency according to the determined rank.

4. The device verification system of claim 3, wherein:

when the operator ends operation, the second processing unit retrieves operation information of the operator's operation and stores the retrieved operation information in the memory.

5. The device verification system of claim 3, wherein:

when the operator ends operation, the second processing unit retrieves operation information of the operator's operation, retrieves the device information of the operator, integrates the device information with the operation information, and stores the integrated information in the memory to replace previous device information in the memory.

6. A device verification method comprising:

acquiring, through an image acquisition unit of an operation panel, an image of an operator;

transmitting the acquired image to a computer and acquiring a facial image of the operator from the image; and transmitting the facial image to a server; wherein:

the server comprises a memory;

the memory stores a facial image of an authorized operator;

the server is configured to compare the facial image to the facial image stored in the memory to determine whether the received facial image passes verification;

wherein the device verification method further comprises:

before acquiring the image of the operator, receiving an account number and password from an input unit on the operation panel and transmitting the received account number and password to the server;

acquiring, by the server, an authorized account number and password stored in the server;

comparing the received account number and password to the authorized account number and password to determine whether the operator passes verification; and acquiring the image of the operator if the comparison result passes verification.

7. The device verification method of claim 6, wherein:

the operation panel further comprises an alert unit;

the comparison result is transmitted to the computer; and the alert unit is controlled to issue an alert when the comparison result fails verification.

8. The device verification method of claim 6, further comprising:

acquiring device information of the operator when the comparison result of the facial image passes verification;

determining a rank of the operator, storing the determined rank in the server, and transmitting the determined rank to the computer; and controlling an alert unit to issue an alert at a corresponding frequency according to the determined rank.

9. The device verification method of claim 8, further comprising:

retrieving operation information of the operator's operation when the operator ends operation and storing the retrieved operation information in the server.

10. The device verification method of claim 8, further comprising:

retrieving operation information of the operator's operation when the operator ends operation, integrating the device information with the operation information, and storing the integrated information in the server to replace previous device information in the server.

* * * * *